A. H. MIDGLEY & C. A. VANDERVELL.
SELF STARTER FOR INTERNAL COMBUSTION ENGINES.
APPLICATION FILED OCT. 10, 1913.
1,159,061.
Patented Nov. 2, 1915.
2 SHEETS—SHEET 1.
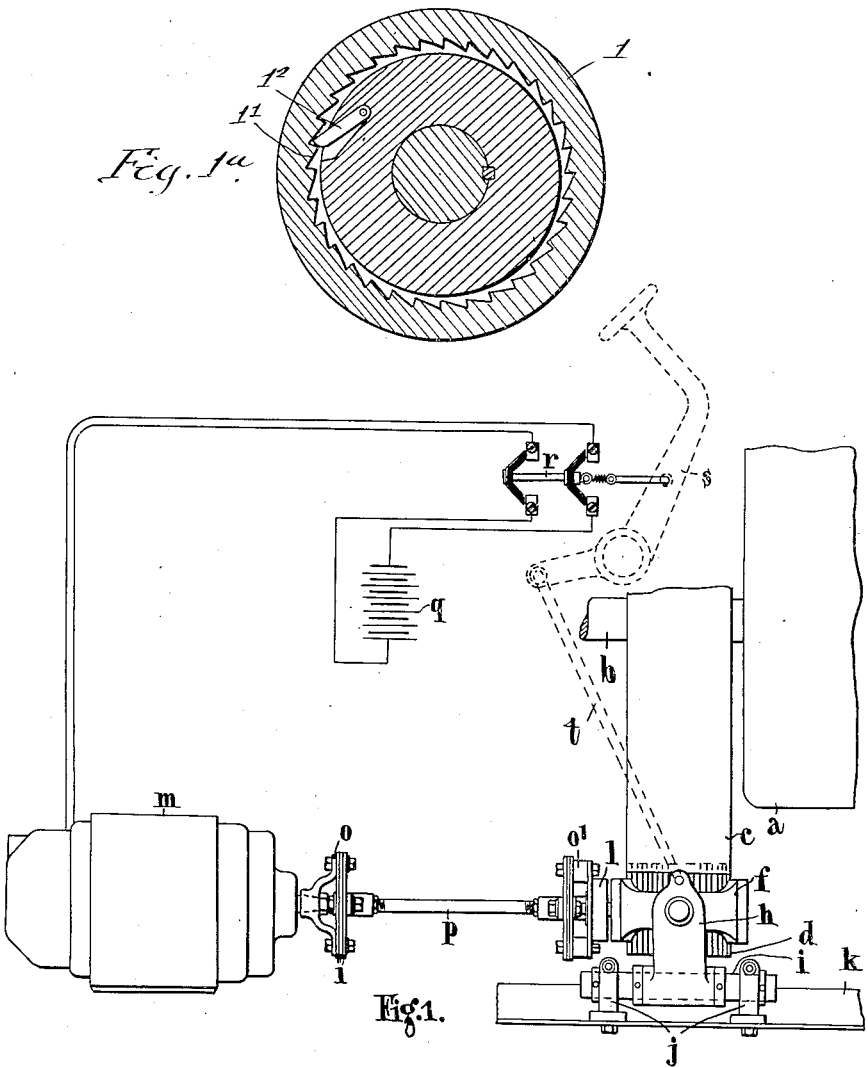

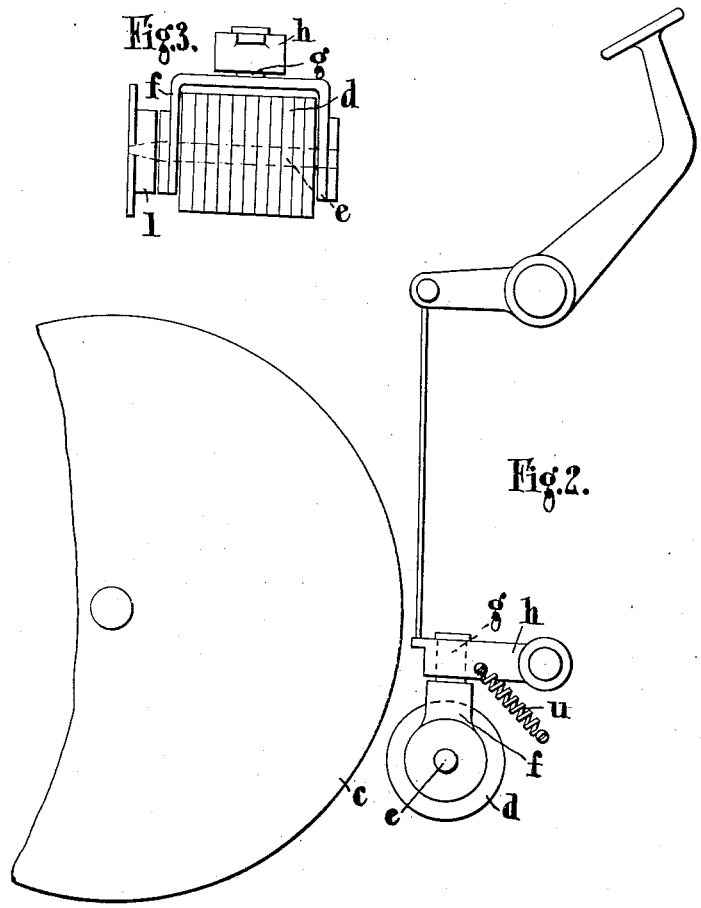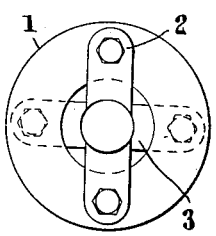

UNITED STATES PATENT OFFICE.

ALBERT HENRY MIDGLEY AND CHARLES ANTHONY VANDERVELL, OF ACTON VALE, ENGLAND.

SELF-STARTER FOR INTERNAL-COMBUSTION ENGINES.

1,159,061.  Specification of Letters Patent.  Patented Nov. 2, 1915.

Application filed October 10, 1913. Serial No. 794,523.

*To all whom it may concern:*

Be it known that we, ALBERT HENRY MIDGLEY and CHARLES ANTHONY VANDERVELL, both subjects of the King of Great Britain and Ireland, and both residing at Warple Way, Acton Vale, in the county of Middlesex, England, have invented certain new and useful Improvements in and Relating to Self-Starters for Internal-Combustion Engines, of which the following is a specification.

This invention relates to an improved self-starter for internal combustion engines such as used on motor cars or the like of the kind in which the starting is effected by means of a friction drive, the driving member of which is entirely disconnected from the engine to be started, and is adapted to be brought into frictional contact with the flywheel of the engine.

The main object of the invention is to provide a simple convenient and reliable self-starter for internal combustion engines, another object being to provide an improved friction drive in which the alinement of the surface of the driving member with the surface of the flywheel is insured.

The invention is illustrated by way of example in the accompanying drawings in which:—

Figures 1 and 2 are diagrammatic illustrations of the starting arrangement showing the same in two different views; Fig. 1ª is a section transverse to the axis of free wheel 1, showing free wheel or ratchet mechanism therefor; Figs. 3 and 4 are details of construction.

Referring to Figs. 1 to 4, $a$ is the engine to be started, $b$ the shaft thereof, and $c$ the flywheel constituting the driven member of the friction drive.

$d$ is a friction pulley fixed to a shaft $e$ which is rotatably mounted in a fork-like member $f$ provided with a short arbor or swivel $g$ mounted in a swiveling bracket $h$ arranged to pivot on a shaft $i$ which is mounted on supports $j$ secured to the chassis $k$ of the motor car. The shaft $e$ on which the pulley is mounted is connected with the shaft of an electric motor $m$ through the intermediary of two universal couplings $o\ o'$ and an intermediate shaft $p$ constituting together a flexible shaft, and through the intermediary of a free wheel $l$ of any well known construction, for example, a ratchet and pawl mechanism $l'\ l^2$ (Fig. 1ª). The length of the shaft $p$ depends upon the distance between the electric motor and the flywheel as necessitated by circumstances.

Each of the universal joints $o\ o'$ comprises a plurality of leather rings $l$, preferably separated from one another by thin steel rings and connected to two forks 2 and 3, which are arranged at right angles to one another, the four forks being secured to the intermediate shaft $p$ and the shaft of the electric motor $m$ and to the intermediate shaft $p$ and the free wheel $l$, respectively.

The electric motor receives its current from a battery of accumulators $q$ of suitable voltage through a double pole switch $r$ which is adapted to be operated by a pedal $s$ when required to start the engine, the pedal being operatively connected with the swiveling bracket $h$ through the intermediary of a steel wire $t$. The pedal $s$ and the steel wire $t$ are shown in dotted lines in Fig. 1 in order to indicate that their positions are represented therein only diagrammatically, the true positions thereof being shown in Fig. 2, wherein the pedal and the steel wire are exactly above the driving pulley $d$.

$u$ is a spring, one end of which is fixed while the other one is connected to the swiveling bracket $h$ for the purpose of returning the latter together with the driving pulley $d$ into the non-operative position when the pedal is released.

The operation of the self-starter is as follows:—When it is desired to start the engine, the pedal $s$ is depressed whereby the steel wire $t$ is caused to move the bracket $h$ together with the fork-like frame $f$ and the pulley $d$ in such a position that the latter is pressed against the flywheel $c$. At the same time the pedal $s$ moves the double switch $r$ in a position in which it closes the circuit of the electric motor $m$, the latter thus being operated by the current from the battery of accumulators $q$, and caused to drive the pulley $d$, which being in frictional contact with the flywheel $c$, turns the latter, thereby starting the engine. Once the engine has been started the pedal is allowed to return to its normal position, whereby the pulley $d$ is removed from the flywheel and the circuit of the electric motor is at the same time interrupted. Should the speed of the engine pass beyond a predetermined value the free wheel will disconnect the electric motor from the driving pulley *d*, thus stopping the action of the latter upon the flywheel.

Fig. 1ᵃ shows suitable free wheel mechanism for pulley *l* comprising a pawl *l²* carried by the shaft or a suitable hub thereon, and internal ratchet teeth *l'* carried by the pulley to coöperate with the pawl. This is simply representative of suitable ratchet or free-wheel mechanism.

Having now described our invention, what we claim as new and desire to secure by Letters Patent is:—

A self-starter for internal combustion engines comprising in combination a flywheel (*c*) attached to the engine and having a straight periphery in its axial direction, a friction pulley (*d*) having a straight periphery in its axial direction, a motor for driving the friction pulley, a flexible shaft between the electric motor and the friction pulley, a fork-like support (*f*) in which the friction pulley is mounted, having a swivel (*g*), a rocking bracket (*h*) receiving said swivel, and means attached to the rocking bracket (*h*) for rocking said bracket and for bringing the friction pulley into contact with the flywheel, whereby the straight periphery of the friction pulley is brought into alinement with the straight periphery of the flywheel, substantially as described.

In testimony whereof we have signed our names to this specification in the presence of two subscribing witnesses.

ALBERT HENRY MIDGLEY.
CHARLES ANTHONY VANDERVELL.

Witnesses:
BERTRAM H. MATTHEWS,
P. A. OUTHWAITE.